United States Patent [19]
Fukada

[11] Patent Number: 6,147,415
[45] Date of Patent: Nov. 14, 2000

[54] PERMANENT MAGNETIC GENERATOR

[76] Inventor: Mitsuhiro Fukada, 3-9-25, Kamiosaki, Shinagawa-ku, Tokyo, Japan

[21] Appl. No.: 09/424,646

[22] PCT Filed: May 12, 1998

[86] PCT No.: PCT/JP98/02106

§ 371 Date: Nov. 26, 1999

§ 102(e) Date: Nov. 26, 1999

[87] PCT Pub. No.: WO98/54463

PCT Pub. Date: Dec. 3, 1998

[30]     Foreign Application Priority Data

May 26, 1997  [JP]  Japan .................................... 9-152815

[51] Int. Cl.[7] ............................. H02K 7/18; F03D 3/06; F03D 9/00
[52] U.S. Cl. ............................. 290/55; 310/156; 290/54; 416/244 R
[58] Field of Search ........................ 290/55, 54; 310/156; 416/40, 41, 117, 244 R; 415/4.1, 4.3, 4.5

[56]          References Cited

U.S. PATENT DOCUMENTS

| 4,318,019 | 3/1982 | Teasley et al. ........................... 310/156 |
| 4,857,753 | 8/1989 | Mewburn-Crook et al. ............. 290/55 |

FOREIGN PATENT DOCUMENTS

| 6-137258 | 5/1994 | Japan | ................................ F03D 3/04 |
| 6-257554 | 9/1994 | Japan | ................................ F03D 3/04 |
| 7-174067 | 7/1995 | Japan | ................................ F03D 1/02 |
| 8-128383 | 5/1996 | Japan | ................................ F03D 3/04 |

*Primary Examiner*—B Mullins
*Attorney, Agent, or Firm*—Ronald E. Greigg; Edwin E. Greigg

[57]          ABSTRACT

A permanent magnetic dynamo comprises a wind gatherable stand having a tapered outer wall surface that extends from the lower end toward the upper end of the wind gatherable stand in order to guide wind upward; a roof supported through support shafts fixedly standing at the peripheral edge of the wind gatherable stand such that an open space is formed above the wind gatherable stand; a rotary shaft pivotably supported by the roof and the wind gatherable stand and having a horizonal drive blades located in the open space at upper end thereof; a permanent magnetic rotor disposed within the wind gatherable stand and fixed to the rotary shaft to rotate to a vertical axis together with the rotary shaft; stator windings disposed as to face annular permanent magnetic cylindrical portions which are connected to horizontal arm portions constituting the permanent magnetic rotor; and diamagnetic annular attachment plates fixedly provided within the wind gatherable stand, so that the permanent magnetic dynamo can efficiently collect wind blown against the wind gatherable stand to the horizontal drive blades and the degree of cogging phenomenon becomes small.

4 Claims, 11 Drawing Sheets

PERMANENT MAGNETIC GENERATOR

FIELD OF THE INVENTION

The present invention relates to a permanent magnetic dynamo which can generate electricity by the use of force of a wind. To be more precise, it concerns a wind-force type permanent magnetic dynamo whose a drive blade rotates regardless of the wind direction. Namely, among the several objects of the present invention are the provision of a permanent magnetic dynamo capable of collecting air current; the provision of such dynamo which is reducing the size of a horizontal drive blade; the provision of such dynamo which is preventing to happen to a cogging phenomenon (revolving with a trembling caused by an attracted phenomenon of the magnetic force when a motor starts); and the provision of such dynamo which is reducing the weight of dynamo. Moreover, the permanent magnetic dynamo can be provided at the wind blowable places such as a camp site, hill, top of building, mountain hut, ship, or automobile.

BACKGROUND OF THE INVENTION

An exemplary conventional wind-force type permanent magnetic dynamo is disclosed in Japaneses Patent applicatioin Laid-Open (kokai) No.8-128383, in which drive blades rotate regardless of the wind direction.

In the embodiment section of that publication, there is described a dynamo comprising a plurality of cage-forming bars which stand on a cylindrical accommodating base at predetermined circumferential intervals and each bar having an arcuate wind guide surface on the inner sides thereof; a dome-shaped roof fixed on the upper ends of the bars; a hollow rotary shaft disposed within the space formed by the cage-forming bars and having radial rotary blades; a permanent magnet rotor fixed to the lower end of the hollow rotary shaft and having an annular permanent magnet; and a stator which is disposed along the inner circumferential wall of the accommodating base to surround the permanent magnet rotor and has stator windings. Each of the cage-forming bars has a flattened wing-like cross section, while each of the rotory blades has a longitudinally extend curved shape for receiving the wind that enters the space formed by the bars.

In the above-described structure, most of wind blown against the cylindrical accommodating base passes therethrough with no effect, while wind impinging laterally against the bars enters the structure through clearances between the bars. As a result, the wind passes through the clearances while rotating the rotary blades.

Accordingly, the part of wind that rotates the rotary blades receives resistance from the surface of the cage-forming bars and must pass through the clearances between the bars, so that a wind force is decreased. Further, a sufficient rotational force cannot be obtained unless each of the rotary blades is formed in the shape of a large curved plate that extends longitudinally. Therefore, the dynamo cannot be made compact. Further, since the rotor and the stator are simple annular members, the length of the stator winding can not be increased, resulting in impossibility of increasing the amount of electricity generation.

Accordingly, the objects of a permanent magnetic dynamo of the present invention are provided as follows;

REMARK

1: A permanent magnetic dynamo can efficiently collect wind blown against a wind gatherable base to a horizontal drive blade, so that the horizontal drive blade can be rotated in efficiency;

2: A horizontal drive blade can be made compact;

3: It can be increased the amount of electricity generation so that the length of a stator winding is longer than that of the stator winding the conventional invention; and 4: The effect of cogging phenomenon can be small.

DISCLOSURE OF THE INVENTION

A permanent magnetic dynamo according to the present invention (the invention described in claim 1) comprises a wind gatherable stand 1 having a tapered outer wall surface 4a that extends from the lower end thereof toward the upper end thereof in order to guide wind upward; a roof 11 supported by support shafts 10 fixedly standing at the peripheral edge of the wind gatherable base 1 such that an open space 17 is formed above the wind gatherable stand 1;a rotary shaft 12 rotatably supported by the roof 11 and the wind gatherable stand 1 and having at its upper end horizontal drive blade 2 located in the open space 17; a permanent magnetic rotor 20 disposed within the wind gatherable stand 1 and fixed to the rotary shaft 12 to rotate about a vertical axis together with the rotary shaft 12; stator windings 30 disposed to face annular permanent magnetic cylindrical portions 25 (27,33) which are connected to horizontal arm portions 24 constituting the permanent magnetic rotor 20; and diamagnetic annular attachment plates 31 (32) fixedly provided within the wind gatherable stand 1. Accordingly, the permanent magnetic dynamo can efficiently collect wind blown against the wind gatherable stand 1 to the horizontal drive blade 2, and wind is allowed to freely escape from the open space 17 after entering there. In addition, since the annular attachment plates of the stator are made of a diamagnetic material, the degree of cogging phenomenon is very small, and the weight of the dynamo can be decreased.

According to the present invention (the invention described in claim 2), in the structure of claim 1, the wind gatherable stand 1 further comprises a base plate 3; a cylindrical wind collector 4 which is fixed to the top surface of the base plate 3 and whose diameter decrease gradually from the lower end toward the upper end; and a plurality of wind-directing partition plates 7 fixed to the outer circumferential wall 4a of the cylindrical wind collector 4 at predetermined intervals in the circumferential direction. Accordingly, in the permanent magnetic dynamo having the above-described structure, the drive blade rotates regardless of the wind direction, and the horizontal drive blade can be rotated efficiently.

According to the present invention (the invention described in claim 3), in the structure of claim 1, the permanent magnetic rotor 20 comprises a center sleeve portion 23 through which the rotary shaft 12 penetrates; first inside permanent magnet cylindrical portions 25 connected to the center sleeve portion 23 through first horizontal arm portion 24; and second outside permanent magnet cylindrical portions 27 connected to the first permanent magnet cylindrical portions 25 through second horizontal arm portions 26. Therefore, the amount of electricity generation can be increased further.

A permanent magnetic dynamo according to the present invention (the invention described in claim 4) comprises a wired gatherable stand 1A having a tapered outer wall surface 4a that extends from the lower end toward the upper end of the wind gatherable stand 1A in order to guide wind upward; a roof 11 supported by support shafts 10 fixedly standing at the peripheral edge of the wind gatherable stand 1A such that an open space 17 is formed above the wind gatherable stand 1A; a rotary shaft 12A rotatably supported by the roof 11 and the wind gatherable stand 1A and having a horizontal drive blade 2 positioned at the open space 17 at upper end thereof; a permanent magnetic rotor 20A disposed within the wind gatherable stand 1A and fixed to the rotary shaft 12A to rotate about a vertical axis together with the rotary shaft 12A; stator windings 30A disposed to face annular permanent magnets m,m . . . of the permanent magnetic rotor 20A; and diamagnetic annular attachment plates 31A (32A) fixedly provided within the wind gatherable stand 1A. Accordingly, a permanent magnetic dynamo described in claim 4 will provided the same effects equal to those of the invention described in claim 1.

In relation to the object of the present invention of cogging phenomenon, the term "diamagnetic material" used herein means feeble magnetic substance (substance contains little magnetic substance) and material which is lighter than iron, regardless of whether the substance is nonferrous metal (such as titanium or stainless steel) or a nonmetallic substance (such as synthetic resin, ceramics, cloth, or paper).

DESCRIPTION OF THE PREFERRED EMBODIMENT

Preferred embodiments of the present invention are described in more detail below referring to the accompanying drawings.

FIGS. 1 to 9 illustrate a first embodiment of a permanent magnetic dynamo X1 which is proper for the use of a wind force.

The numeral 1 is a wind gatherable stand having an outer wall that extends from the lower end toward the upper end of the wind gatherable base in order to guide wind to a horizontal drive blade 2 located upward thereof. The wind gatherable stand 1 comprises a base plate 3; a cylindrical wind collector 4 which is fixed to the top surface of the base plate 3 and whose diameter decrease gradually from the lower end toward the upper end; a cover 6 capable of closing an upper end opening on the wind collector 4 having an axle hole 5 at a center part thereof; and a plurality of wind-directing partition plates 7 fixed to an outer circumferential wall 4a of the cylindrical wind collector 4 at predetermined intervals in the circumferential direction. Further, the triangle partition plates 7 are provided at least more than three plates (four plates in this embodiment) in order to guide wind blown against the outer circumferential wall 4a to a horizontal drive blade 2 located upward the wind gatherable stand 1 regardless of the wind direction such that wind may blow from any direction. These partition plates 7 are fixed on the outer circumferential wall 4a to the vertical direction. In addition, the partition plates 7 may be fixed to the diagonal or spiral direction on condition that the partition plates 7 have a function to guide wind upward. These are also formed in a curve-shaped a little.

Figure 1:
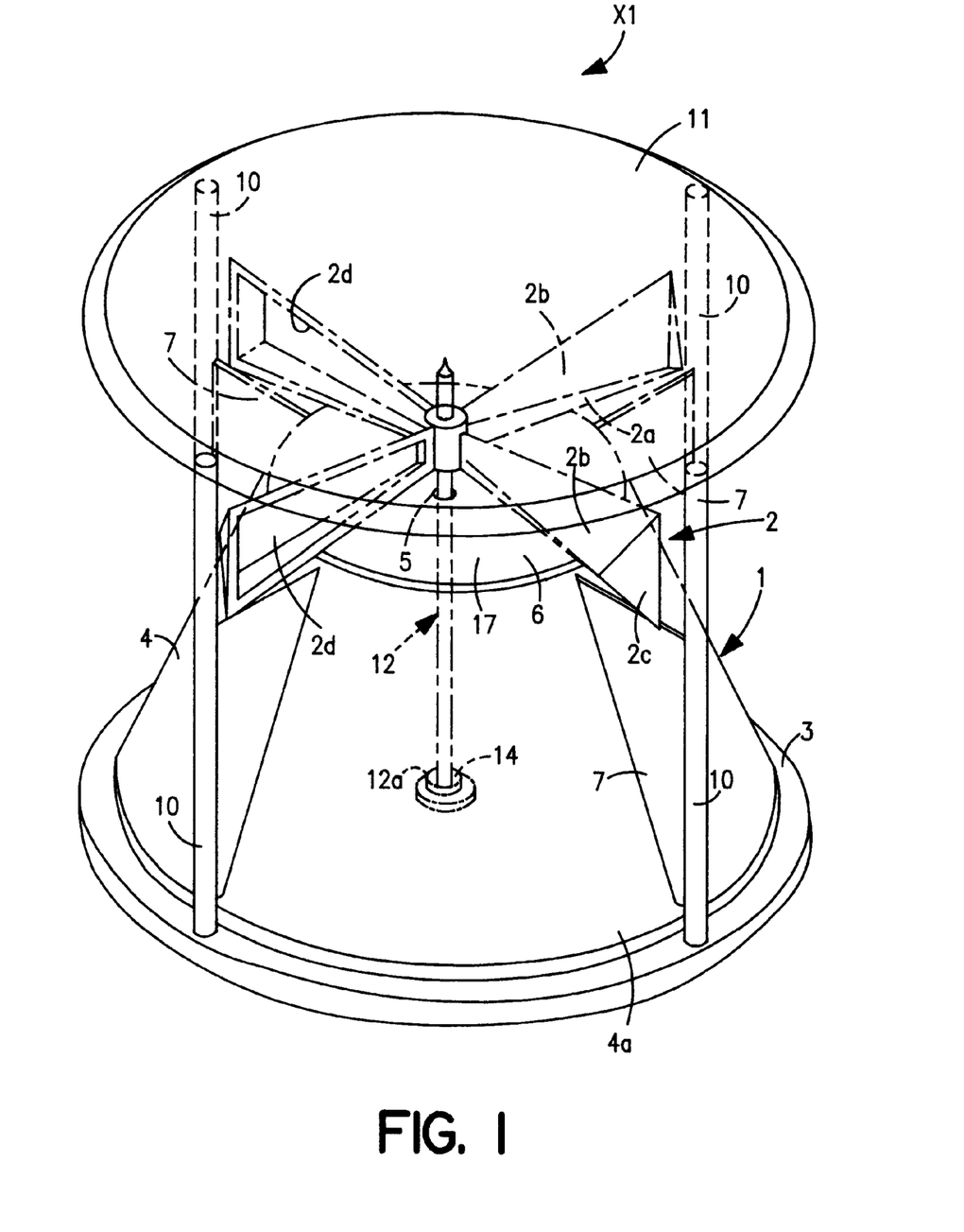
FIG. 1 is a perspective view of an appearance showing a first embodiment of the present invention.
Figure 2:
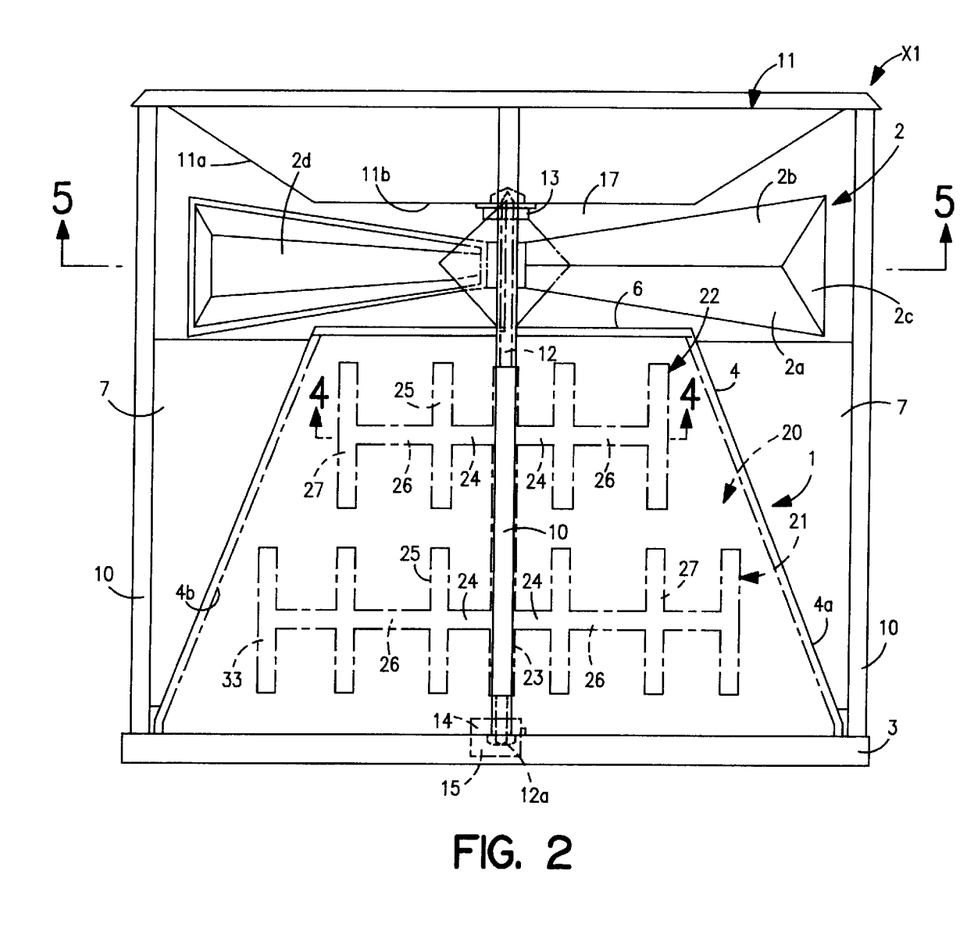
FIG. 2 is a schematic explanation view of a main part of the present invention.

Therefore, the wind gatherable stand 1 as shown in FIG. 1 is formed in the shape of a frustum of a pyramid or a cone, as appearance, with the wind-directing partition plates 7. The outer circumferential wall 4a of the cylindrical wind collector 4 is formed in the taper-shaped in order to make whole current of wind blown against the outer circumferential wall 4a direct to the fixed direction (upward in this embodiment) or can converge (collect) it. Therefore, the appearance of the wind gatherable stand 1 may be not formed of the above shape but also formed of a trapezuim of sphere or corn.

The numeral 10 is a plurality of support shafts fixedly standing at the peripheral edge of the wind gatherable stand 1. Four support shafts 10 in this embodiment are fixed at ninety degrees intervals; each of lower end portions of the shafts 10 are fixed to the base plate 3 of the wind gatherable stand 1; and while each of upper end portions thereof are fixedly provided a roof 11 in the opposite shape of a frustum of cone as to the opposite side to a cover 6 of the wind gatherable stand 1.

The partition plates 7 are formed in the shape of right-angled triangle; one side thereof is fixed to the outer circumferential wall 4a of the cylindrical wind collector 4; and other side thereof is fixed to each of the support shafts 10. Then the support shafts 10 and partition plate 7, as it were that three to ten pieces thereof is desirable, should be provided the wind gatherable stand 1 at the predetermined intervals. Also the roof 11 has a function of a shelter from rain and a wind-guide to guide wind blown against the tapered outer circumferential wall 11a of the roof 11 to the horizontal drive blade 2 (downward direction).

Figure 7:
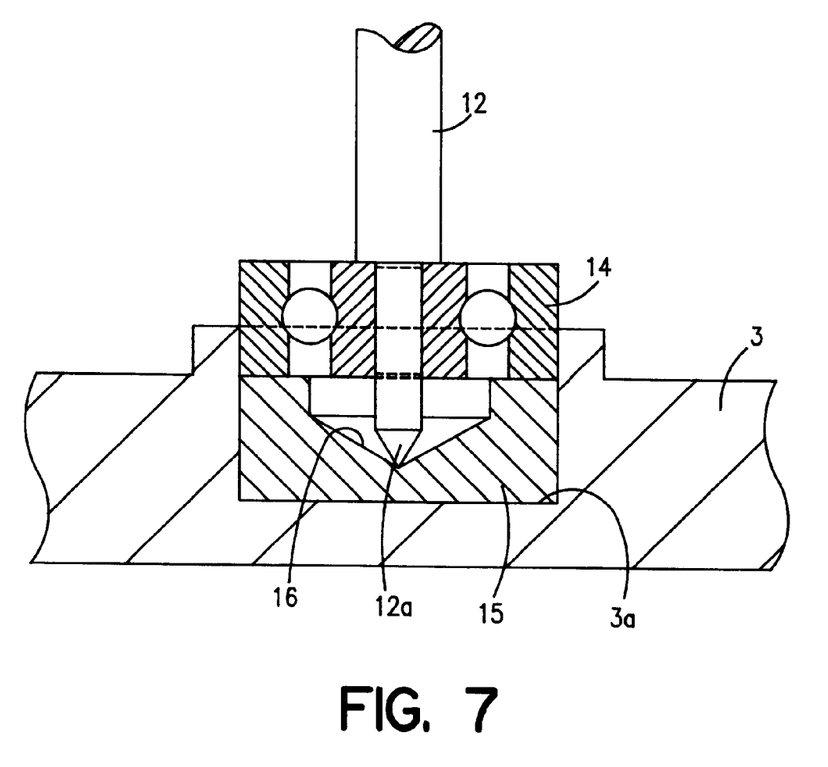
FIG. 7 is a schematic cross-sectional explanation view of a main part of the present invention.
Figure 8:
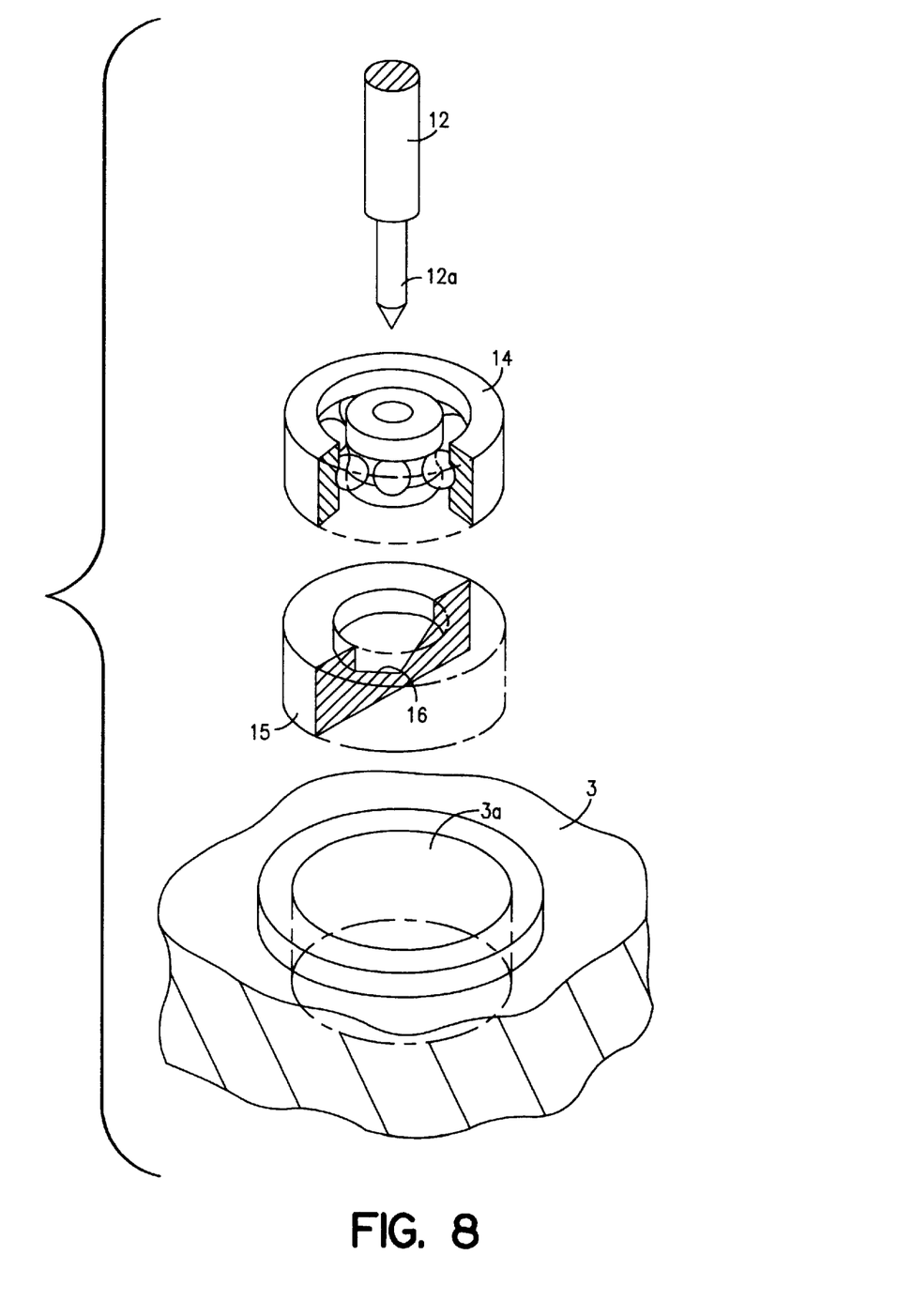
FIG. 8 is an exploded explanation view of a main part of the present invention.

The numeral 12 is a rotary shaft which penetrates to an axle hole 5 of the cover 6 of the wind gatherable stand 1. The rotary shaft 12 is pivotably mounted through an upper bearing member 13 provided at the roof 11 and a lower bearing member 14 provided to the base plate 3 of the wind gatherable stand 1. The bearing members 13 and 14 are used of a ball bearing in this case. The upper bearing member 13 is attached into an opposite recess which is formed at the center portion of the roof 11, while the bearing member 14, as shown in FIGS. 7 and 8, is attached through an axle tip case 15 in the shape of a block which fits into a recess 3a formed at the center part of the base plate 3. In addition, in this embodiment, a sharpened lower part 12a of the rotary shaft 12 fits freely into an opposite angle section-shaped recess 16 of the axle tip case 15, the axle tip case 15 also can support the weight the rotary shaft 12 at the point. As a result, the frictional resistance between the axle tip case 15 and the rotary shaft 12 can be reduced.

The horizontal drive blade 2 is fixedly mounted on the upper end portion of the rotary shaft 12 as to locate in the open space 17 formed between the cover 6 of the wind gatherable stand 1 and the lower surface 11b of the roof 11. In addition, a plurality of blade parts, four blade parts in this embodiment, of the horizontal drive blade 2 extends radially from the rotary shaft 12, and the horizontal drive blade 2 further comprises a first tapered wind cut surface 2a, a second tapered wind cut surface 2b, and a third end tapered wind cut surface 2c; the first wind cut surface 2a cuts wind blown from the wind gatherable stand 1 side toward the open space 17; the second wind cut surface 2b cuts wind blown from the roof 11 side toward the open space 17; and a third end wind cut surface 2c cuts directory a side wind by its horizontal drive blade. Furthermore, the horizontal drive blade 2 has a wind blown surface 2d, in the curved-shape or recess, formed at the opposite side of those wind cut surfaces 2a, 2b, and 2c, and receive side wind blown directory against the horizontal drive blade 2 and wind (air current) which flows indirectry from the wind gatherable stand 1 and roof 11 toward the open space 17. Each of blade parts of the horizontal drive blade 2 is formed of an arm-shaped and whose diameter increases gradually from the attachment base end portion toward the top end portion of the blade part.

The permanent magnetic rotor 20 is fixed to the drive shaft 12 and provided into the wind gatherable stand 1 as to rotate with the drive shaft 12 to the horizontal direction. This permanent magnetic rotor 20 comprises a lower permanent magnetic rotor 21 positioned at the lower part thereof in this embodiment and an upper permanent magnetic rotor 21 positioned at the upper part thereof. Each of the lower and upper permanent magnetic rotors 21 and 22 is an annular magnet connected body molded by synthetic resin. Accordingly, the structure of the upper permanent magnetic rotor 22 is described in details, while the lower permanent magnetic rotor 21 has only one more permanent magnetic cylindrical portion as compared with the upper permanent magnetic rotor 22. Therefore, the detailed explanation of the lower permanent magnetic rotor 21 is omitted for convenience' sake.

Figure 3:
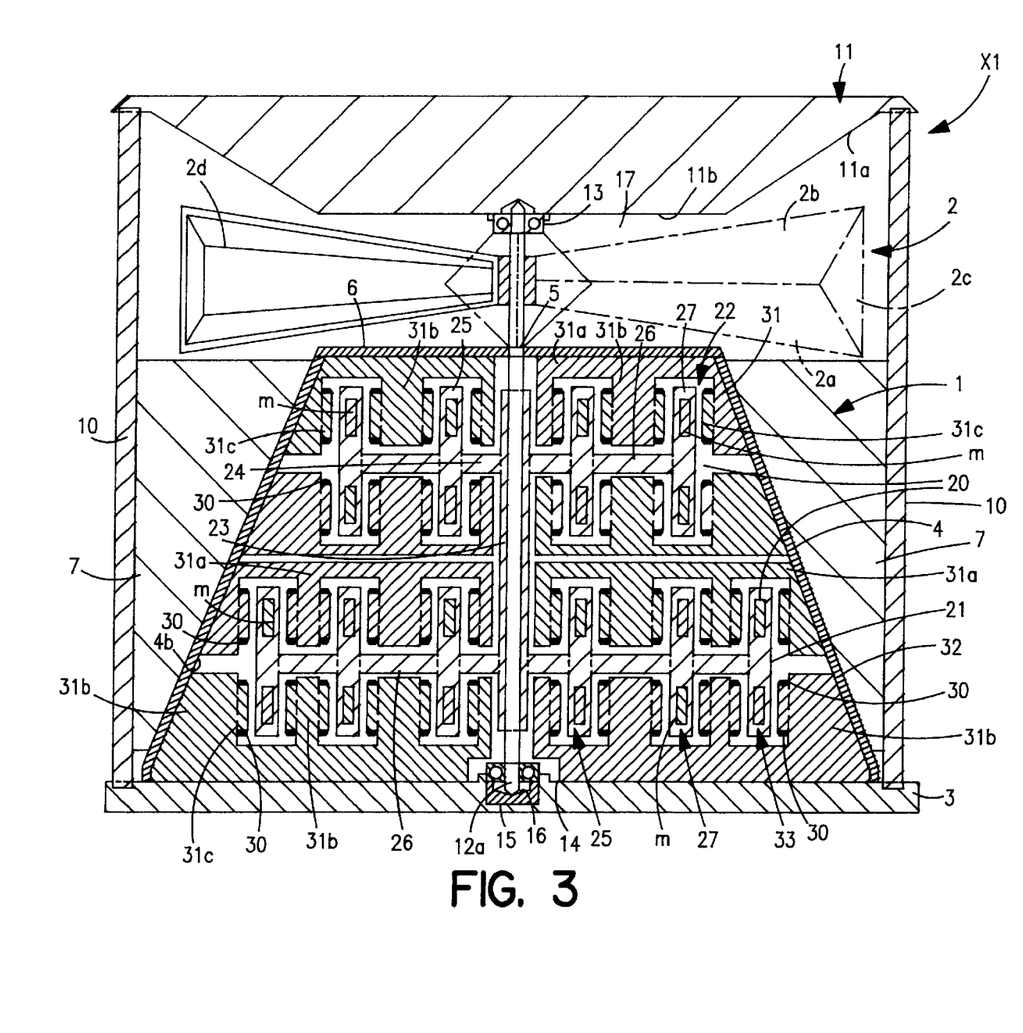
FIG. 3 is a schematic longitudinal sectional view.
Figure 4:
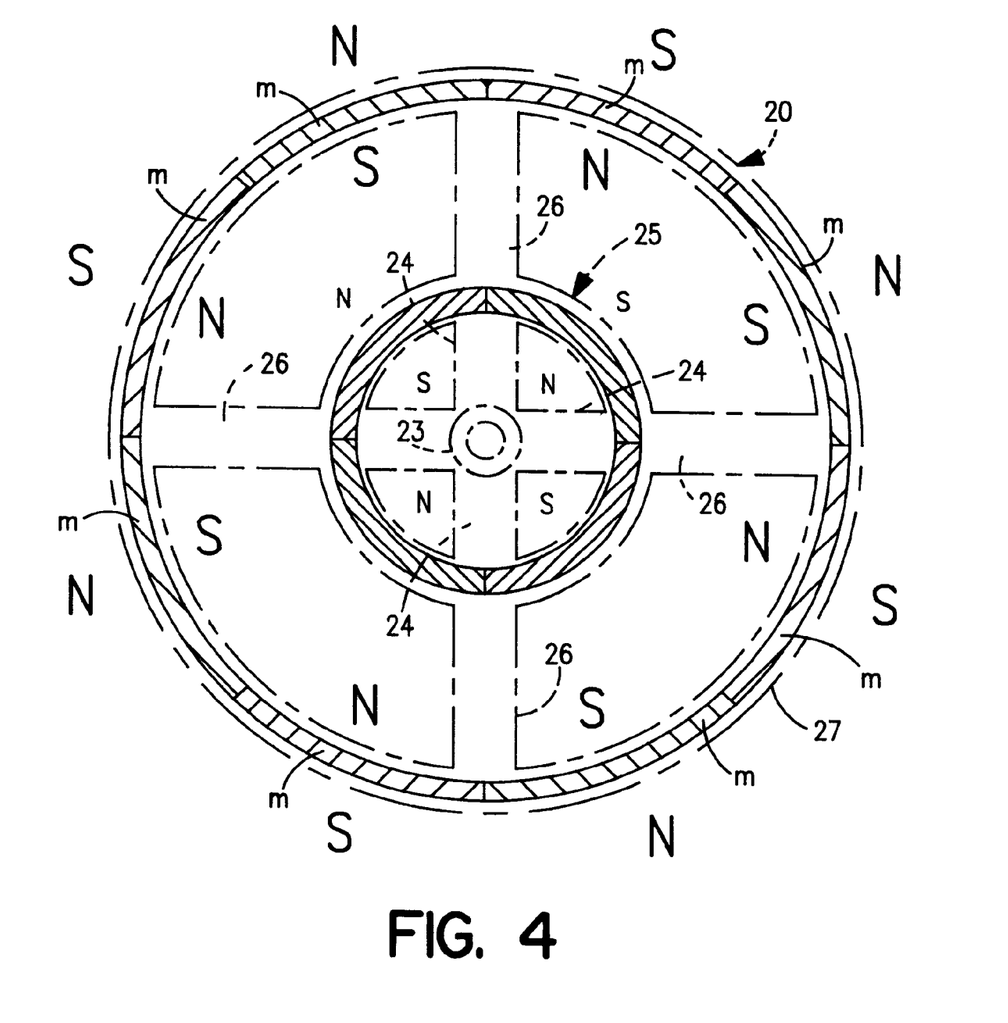
FIG. 4 is a schematic cross-sectional view taken on line 4—4 of FIG. 2.
Figure 5:
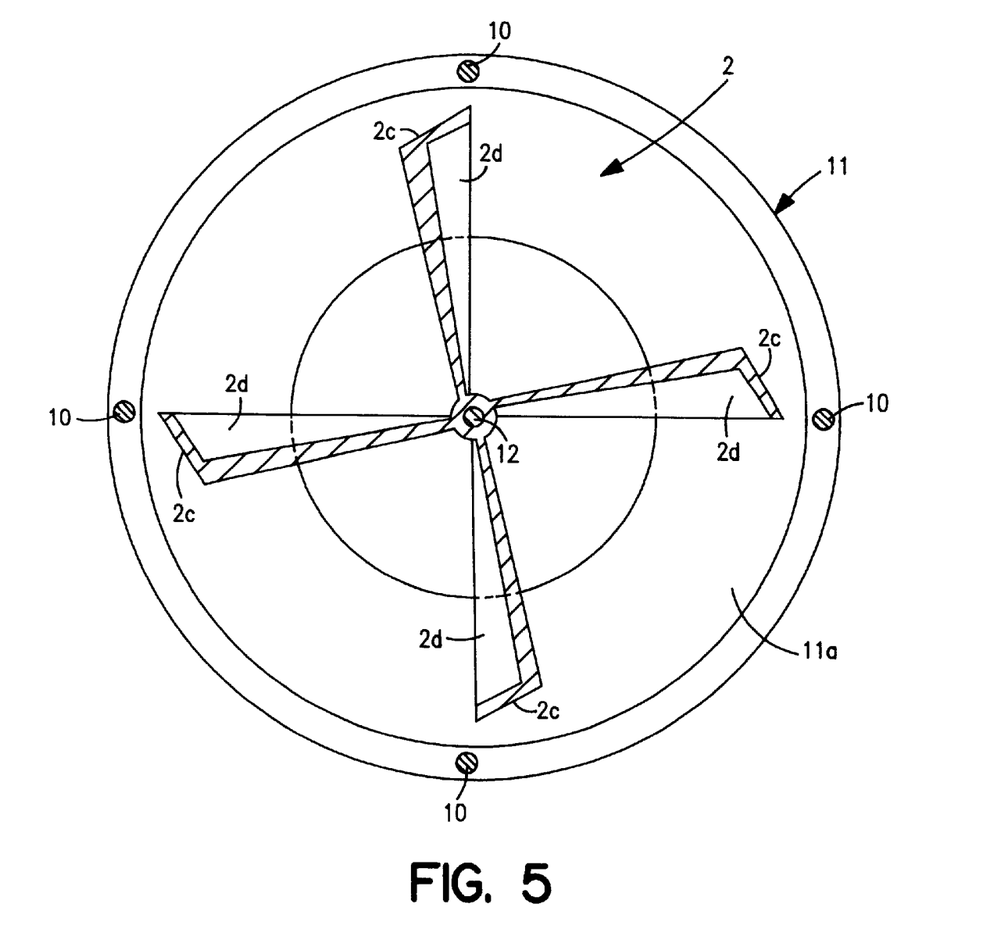
FIG. 5 is a schematic cross-sectional view taken on line 5—5 of FIG. 2.
Figure 6:
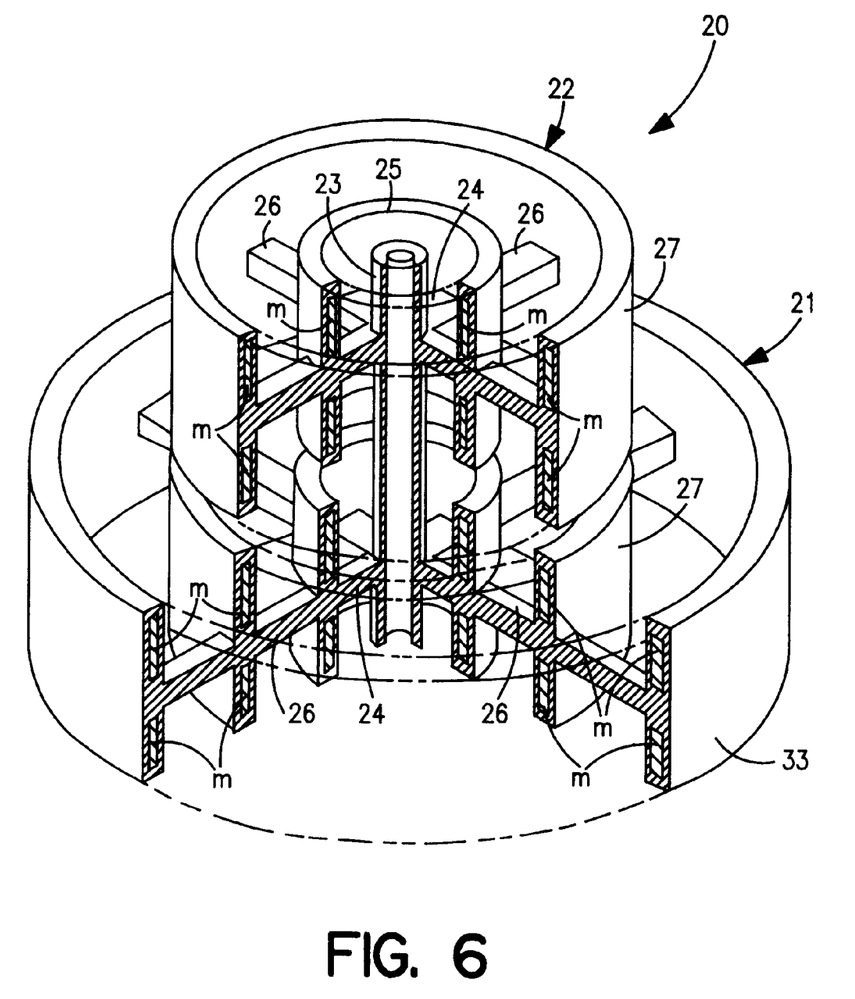
FIG. 6 is an explanation view of a permanent magnetic rotor.

Accordingly, the upper permanent magnetic rotor 22, as shown in FIG. 3, comprises a center sleeve portion 23 through which the rotary shaft 12 penetrates, an first inside permanent magnetic cylindrical portion 25, connected to the center sleeve portion 23 via first horizontal arm portion 24; and second outside permanent magnetic cylindrical portion 27 connected to the first permanent magnetic cylindrical portion 25 via second horizontal arm portion 26. The first and second permanent magnetic cylindrical portions 25 and 27 have a plurality of permanent magnets m,m . . . which are disposed at upper and lower parts thereof such that alternating N-poles and s-poles are arranged in an annular-shaped in the circumferential direction. In this embodiment, one of annular permanent magnets m,m . . . as shown in FIG. 4 is formed in a curve-shaped at the same bending ratio as to form of the annular magnet connected body. Therefore, the radius of one of the annular permanent magnet of the first permanent magnetic cylindrical portion 25 is naturally smaller than that of one of annular permanent magnet of the second permanent magnet cylindrical portion 27.

The numeral 30 is a stator winding which is disposed as to face the upper and lower permanent magnetic rotors 21 and 22. The stator winding 30 is provided inside the wind gatherable stand 1 through a plurality of attachment plates 31 and 32 for the stator winding projected on an inner circumferential wall 4b of the cylindrical wind collector 4 with the wind gatherable stand 1 to the inside direction. The stator in this embodiment comprises at least one or more annular attachment plates 31 (or 32) for the stator winding and a stator winding 30 wound around the annular attachment plate 31 (or 32).

The upper side annular attachment plate 31 comprises a horizontal fixed plate portion 31a, a plurality of annular vertical fixed plate portion 31b, and a conductor attachment portion 31c. The horizontal fixed plate portion 31a extends in horizontal to the inside direction from the inner circumferential wall 4b of the cylindrical wind collector 4. The plurality of vertical fixed plate portion 31b is oppositely provided to the outer and inner circumferential walls of the permanent magnetic cylindrical portion and projects as to cross to the horizontal fixed plate portion 31a. The conductor attachment portions 31c is provided as to project on the vertical surface of these vertical fixed plates 31b.

Then the numeral 32 is a pair of annular attachment plate for stator winding positioned downward the attachment plate 31. The lower annular attachment plate 32 has same structure of a pair of the upper annular attachment plate 31 positioned at the upper side portion thereof. The stator winding 30 as a leading wire is wound around each of the conductor attachment portions 31a of the annular attachment plate 31 (32). Accordingly, the slator winding 30 wound around each of the conductor attachment portion 31c intersects to each of permanent magnets of permanent magnetic rotor 20 which rotates to the rotary direction. The numeral 33 is a third permanent magnetic cylindrical portion which is provided the outermost part of the lower permanent magnetic rotor 21.

On the other hand, the upper and lower annular attachment plates 31 and 32 as stator are formed of a diamagnetic material. The term "diamagnetic material" herein explains the meaning in a section of "Disclosure of the invention". The upper and lower annular attachment plates 31 and 32 in this embodiment are formed of synthetic resin material (polycabonate). In addition, each of the permanent magnets of the above-described permanent magnetic rotor 20 is used in "Shinetsu Rare Earth Magnet" (41,1~48 MGOe) manufactured and sold by Shin-Etsu Chemical Co.,Ltd., Japan. The number of the permanent magnet which constructs of the annular magnet connected body may be two, three, or five pieces thereof. The center axle 2 and drive blades 3 are formed of hard synthetic resin (light material) in order to reduce the weight of the permanent magnetic dynamo X1.

Figure 9:
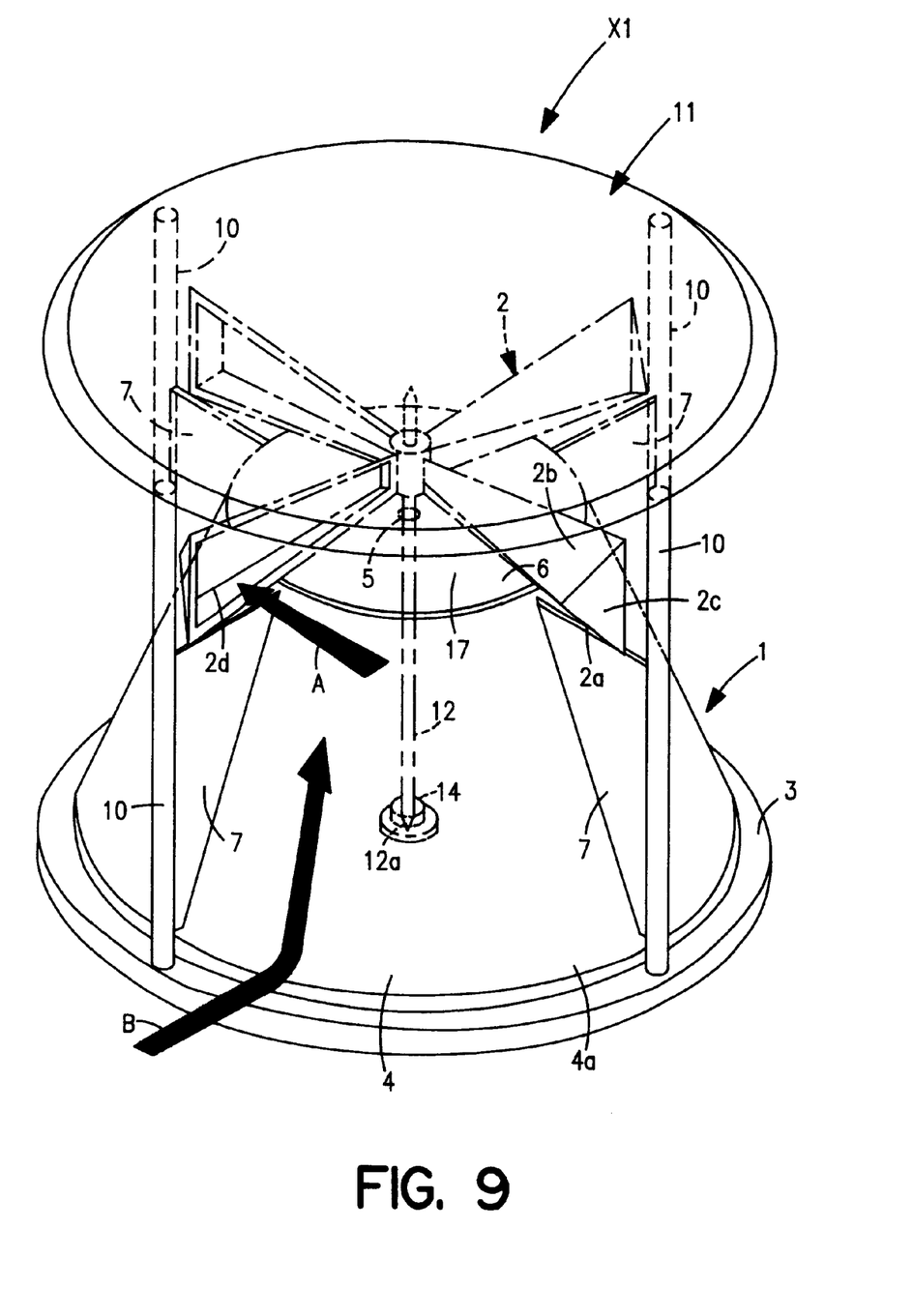
FIG. 9 is a schematic explanation view showing a condition of the wind direction to a horizontal drive blade.

Concerning the above-identified invention, as shown in FIG.9, it supposes that the wind blows from some direction now. In this case, the horizontal drive blade 2 rotates clockwise by a side wind A which blows directly to a wind blown surface 2d of the horizontal drive blade 2 and wind B (air current) flows indirectry from the wind gatherable stand 1 and roof 11 toward the open space 17. Then the side wind A and wind B (air current) blow directly through the open space 17 as the current of the wind, and the horizontal drive blade 2 cuts through the wind A and B.

After that, when the horizontal drive blade 2 rotates by the use of the wind power, the rotary axle 12 also rotates with the horizontal drive blade 2 in the same direction. During rotation, the magnetic field of the permanent magnetic rotor 20 rotating with the rotary shaft 12 crosses to the intersection for the stator winding 30. The rotor 20 instantly moves relatively into the magnetic flux alternating N-poles and S-poles, that is, it happens the caused voltage (alternating current) to the stator winding 30, electricity can be taken from the stator winding 30.

OTHER EMBODIMENT

A second embodiment of the present invention, the same as the structure of the first embodiment, will be described. Through the drawings of te embodiment, like components are denoted by like numerals as of the first embodiment and will not be further explained.

Figure 10:
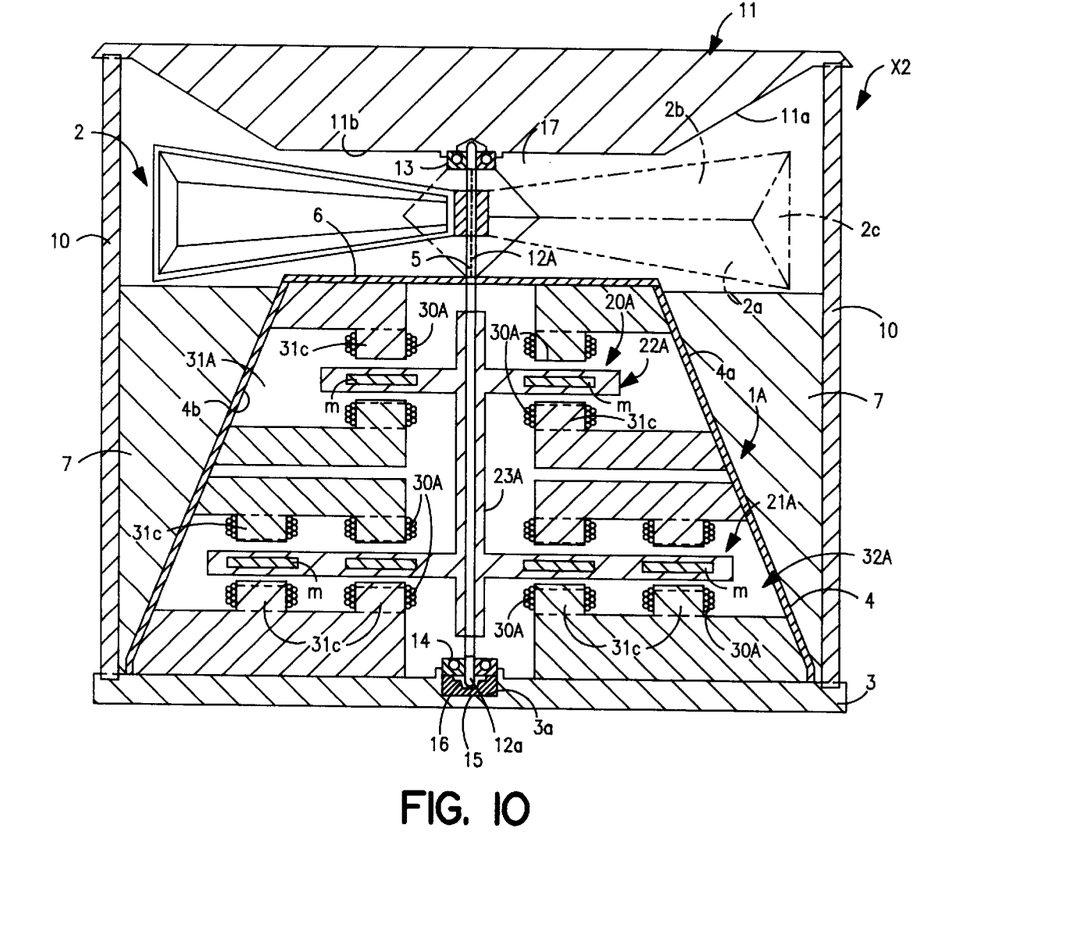
FIG. 10 is a schematic longitudinal sectional view of a second embodiment of the present invention.
Figure 11:
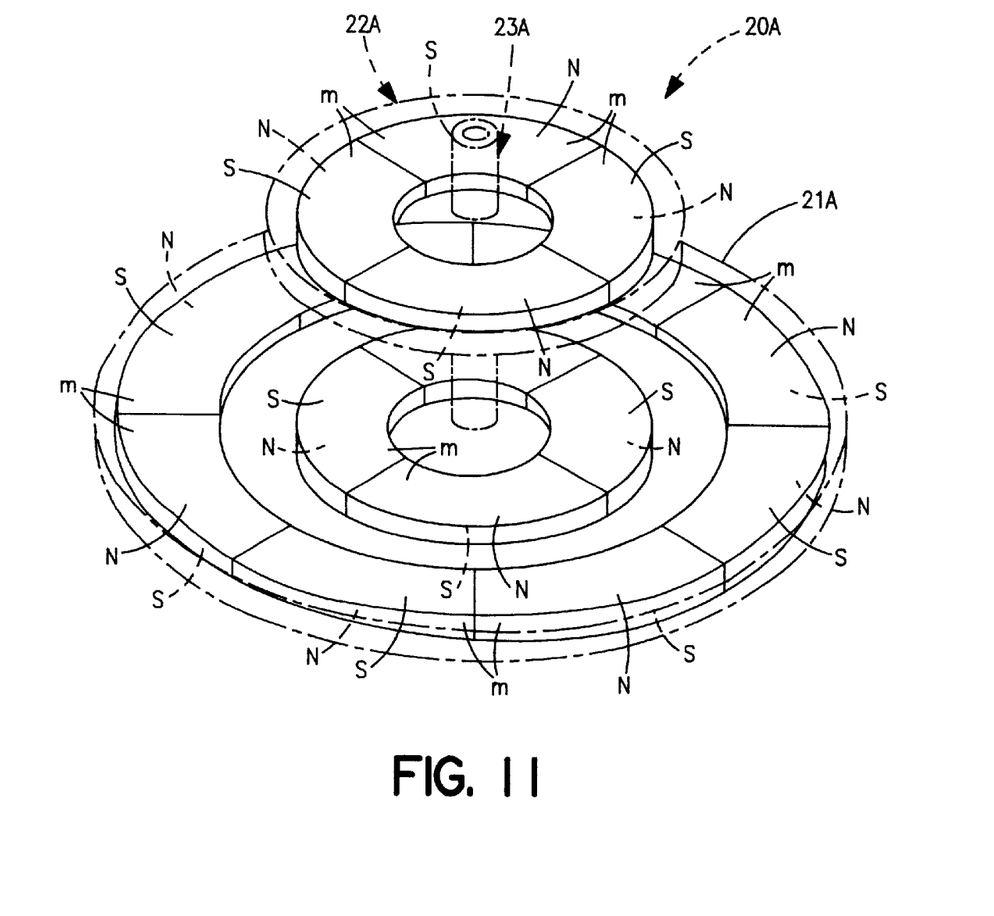
FIG. 11 is an explanation view of a permanent magnetic rotor of second embodiment of the present invention.

FIGS. 10 and 11 illustrate a permanent magnetic dynamo X2 of a second embodiment of the present invention which is distinguished from the first embodiment by the fact of a structure of a permanent magnetic rotor 20A which is provided into a wind gatherable stand 1A in the shape of a frustum of a cone. The structure of the permanent magnetic rotor 20A is the same as the rotor 20 of the first embodiment, that is, the permanent megnetic rotor 20A has integrally lower and upper permanent magnetic rotor portions 21A and 22A through a center sleeve portion 23A around a rotary shaft 12A, while each of upper and lower permanent magnetic rotor portions 21A and 22A is formed in the shape of a disc.

The lower permanent magnetic rotor portion 21A as shown in FIG. 11 is molded by synthetic resin, a plurality of permanent magnets m,m . . . are provided in the annular shape on the same plane. The annular magnetic connected body has double rings as inner ring and outer ring, so that a predetermined space is formed between the inner ring and outer ring. Furthermore, the upper permanent magnetic rotor 22A is also molded by synthetic resin, a plurality of permanent magnets m,m . . . are provided in the shape of annular on the same plane. The annular magnetic connected body has a single ring.

Namely, as shown in FIG. 10, each of a plurality of conductor attachment portions 31C, formed at the upper and lower annular attachment plates 31A and 32A of the stator, is projected to the vertical direction cooperate to the permanent magnets m,m . . . , and the stator winding 30A is wound around the conductor attachment portions 30A. Accordingly, the permanent magnetic dynamo X2 of the second embodiment will provide the effects equal to those of the first embodiment.

Concerning the first and second embodiments, a pair of upper and lower permanent magnetic attachment plates is shown in the separated drawing, while the upper and lower permanent magnetic attachment plates may be integrally provided together.

DESCRIPTION OF NUMBERS

X1, X2: a permanent magnetic dynamo,
1, 1A: a wing gatherable stand,
2: a horizontal drive blade,
4: a cylindrical wind collector,
7: a partition plate,
10: a support shaft,
11: a cover,
12, 12A: a rotary shaft,
13, 14: a bearing member,
20, 20A: a permanent magnetic rotor,
23, 23A: a center sleeve portion,
24, 26: a horizontal arm portion,
25, 27, 33: a permanent magnetic cylindrical portion,
30, 30A: a stator winding,
31, 31A: an upper annular attachment plate, and
32, 32A: a lower annular attachment plate.

The foregoing relates to a preferred exemplary embodiment of the invention, it being understood that other variants and embodiments thereof are possible within the spirit and scope of the invention, the latter being defined by the appended claims.

What is claimed is:

1. A permanent magnetic dynamo comprising:
   a wind gatherable stand (1) including
   a cylindrical wind collector (4) having a diameter decreasing from
   a lower end diameter to an upper end diameter gradually, and
   a plurality of wind-directing partition plates (7) provided fixedly to a tapered outer wall surface (4a) of said cylindrical wind collector (4), said wind-directing partition plates disposed respectively on said tapered outer wall surface (4a) at predetermined intervals in a circumferential direction;
   a roof (11) supported by support shafts (10) fixedly standing at a peripheral edge of said wind gatherable stand (1) such that an open space (17) is formed above said wind gatherable stand (11);
   a rotary shaft (12) pivotably supported by said roof (11) and said wind gatherable stand (1);
   a horizontal drive blade (2) provided at an upper end portion of said rotary shaft (12), a tip portion of said horizontal drive blade (2) extending to said open space (17) located above said tapered outer wall surface (4a);
   a permanent magnetic rotor (20) disposed within said wind gatherable stand (1) and fixed to said rotary shaft (12) to rotate above a vertical axis together with the rotary shaft (12);
   stator windings (30) associated with annular permanent magnetic cylindrical portions (25, 27, 33), having a shape of a crisscross sectionally, connected to horizontal arm portions (24) constituting said permanent magnetic rotor (20), said stator windings being disposed so as to face an internal portion and an external portion of said cylindrical portions (25, 27, 33); and
   diamagnetic annular attachment plates (31, 32) fixedly provided within said wind gatherable stand (1), and said stator windings are wound respectively upon said attachment plates (31, 32).

2. A permanent magnetic dynamo according to claim 1, wherein said permanent magnetic rotor (20) further comprises a center sleeve portion (23) through which said rotary shaft (12) penetrates, first inside permanent magnet cylindrical portions (25) connected to said center sleeve portion (23) through which said rotary shaft (12) penetrates, first inside permanent magnet cylindrical portions (25) connected to said center sleeve portion (23) through first horizontal arm portions (24); and second outside permanent magnet cylindrical portions (27) connected to said first permanent magnet cylindrical portions (25) through second horizontal arm portions (26).

3. A permanent magnetic dynamo comprising:
   wind gatherable stand (1A) including
   a cylindrical wind collector (4) having a diameter decreasing from a lower end diameter to an upper end diameter gradually, and
   a plurality of wind-directing partition plates (7) provided fixedly to a tapered outer wall surface (4a) of said cylindrical wind collector (4), said wind-directing partition plates disposed respectively on said tapered outer wall surface (4a) at predetermined intervals in a circumferential direction;
   a roof (11) supported by support shafts (10) fixedly standing at a peripheral edge of said wind gatherable stand (1) such that an open space (17) located above said tapered outer wall surface (4a);
   a permanent magnetic rotor (20A), formed in a shape of a disc, disposed within said wind gatherable stand (1A) and fixed to said rotary shaft (12A) to rotate about a vertical axis together with the rotary shaft (12A);
   stator windings (30A) disposed so as to face above and below annular permanent magnets of said permanent magnetic rotor (20A); and
   diamagnetic annular attachment plates (31A, 32A) fixedly provided within said wind gatherable stand (1A), having said stator windings (30A) thereon.

4. A permanent magnetic dynamo according to claim 3, wherein said permanent magnetic stator (20A) has at least one permanent magnetic rotor portion (21A, 22A) integrally provided on a center sleeve portion (23A) fixed by said rotary shaft (12A), a permanent magnetic rotor portion thereof has a plurality of permanent magnets disposed in an annular-shape on the same plane.

* * * * *